(12) United States Patent
Okada et al.

(10) Patent No.: US 11,397,006 B2
(45) Date of Patent: Jul. 26, 2022

(54) GAS TURBINE COMBUSTOR (71) Applicant: KAWASAKI JUKOGYO KABUSHIKI KAISHA, Kobe (JP)

(72) Inventors: Kunio Okada, Kakogawa (JP); Atsushi Horikawa, Akashi (JP)

(73) Assignee: KAWASAKI JUKOGYO KABUSHIKT KAISHA, Kobe (JP)

(*) Notice: Subject to any disclaimer, the term of this patent is extended or adjusted under 35 U.S.C. 154(b) by 155 days.

(21) Appl. No.: 16/145,692

(22) Filed: Sep. 28, 2018

(65) Prior Publication Data
US 2019/0032919 A1 Jan. 31, 2019

Related U.S. Application Data (63) Continuation of application No. PCT/JP2017/013089, filed on Mar. 29, 2017.

(30) Foreign Application Priority Data

Apr. 1, 2016 (JP) .............................. JP2016-074349

(51) Int. Cl.
*F23R 3/30* (2006.01)
*F02C 3/30* (2006.01)
(Continued)

(52) U.S. Cl.
CPC ................. *F23R 3/30* (2013.01); *F02C 3/30* (2013.01); *F02C 7/22* (2013.01); *F23R 3/00* (2013.01);
(Continued)

(58) Field of Classification Search
CPC .... F02C 3/30; F02C 7/22; F23D 14/02; F23D 14/08; F23D 14/22; F23D 14/24; F23D 14/48; F23D 14/64
See application file for complete search history.

(56) References Cited

U.S. PATENT DOCUMENTS

| 5,423,173 A | 6/1995 | Lemon et al. |
| 6,101,814 A | 8/2000 | Hoke et al. |
| (Continued) | | |

FOREIGN PATENT DOCUMENTS

| CN | 102901125 A | 1/2013 |
| JP | 06-066156 A | 3/1994 |
| (Continued) | | |

OTHER PUBLICATIONS

International Search Report for PCT/JP2017/013089 dated, Jun. 27, 2017 (PCT/ISA/210).

*Primary Examiner* — Ehud Gartenberg
*Assistant Examiner* — David P. Olynick
(74) *Attorney, Agent, or Firm* — Sughrue Mion, PLLC (57) ABSTRACT

Provided is a combustor used in a gas turbine and configured to mix and burn fuel gas, water vapor, and air. The combustor includes: a fuel injection device including a fuel injection portion which directly injects the fuel gas into a combustion chamber, and a water vapor injection portion provided in at least one of a position radially outward of the fuel injection portion and a position radially inward of the fuel injection portion; and an air supply chamber which is provided in at least one of a position radially outward of the water vapor injection portion provided radially outward of the fuel injection portion and a position radially inward of the water vapor injection portion provided radially inward of the fuel injection portion, and which supplies air to be mixed with water vapor injected from the water vapor injection portion.

12 Claims, 6 Drawing Sheets

(51) Int. Cl.
*F02C 7/22* (2006.01)
*F23R 3/10* (2006.01)
*F23R 3/28* (2006.01)
*F23R 3/00* (2006.01)

(52) U.S. Cl.
CPC .............. *F23R 3/002* (2013.01); *F23R 3/10* (2013.01); *F23R 3/28* (2013.01); *F05D 2220/32* (2013.01); *F05D 2240/35* (2013.01)

(56) References Cited

U.S. PATENT DOCUMENTS

| | | | |
|---|---|---|---|
| 9,121,611 B2 | 9/2015 | Koizumi et al. | |
| 2003/0141383 A1* | 7/2003 | Hayashi | F23C 7/004 |
| | | | 239/406 |
| 2007/0003897 A1* | 1/2007 | Koizumi | F23R 3/286 |
| | | | 431/354 |
| 2008/0010992 A1* | 1/2008 | Patterson | F23R 3/06 |
| | | | 60/772 |
| 2013/0029277 A1 | 1/2013 | Koizumi et al. | |
| 2013/0055698 A1* | 3/2013 | Fletcher | F02C 3/30 |
| | | | 60/39.55 |
| 2014/0283498 A1* | 9/2014 | Horikawa | F02C 3/22 |
| | | | 60/39.19 |
| 2015/0354823 A1 | 12/2015 | Koizumi et al. | |
| 2016/0169160 A1 | 6/2016 | Okada et al. | |
| 2017/0159561 A1* | 6/2017 | Shershnyov | F23R 3/28 |
| 2017/0350598 A1* | 12/2017 | Boardman | F23R 3/16 |

FOREIGN PATENT DOCUMENTS

| | | |
|---|---|---|
| JP | 7-293826 A | 11/1995 |
| JP | 09-501486 A | 2/1997 |
| JP | 2015-075314 A | 4/2015 |
| JP | 2015-230120 A | 12/2015 |
| WO | 95/04244 A1 | 2/1995 |

* cited by examiner

GAS TURBINE COMBUSTOR

CROSS REFERENCE TO THE RELATED APPLICATION

This application is a continuation application, under 35 U.S.C. § 111(a), of international application No. PCT/JP2017/013089, filed Mar. 29, 2017, which claims priority to Japanese patent application No. 2016-074349, filed Apr. 1, 2016, the disclosure of which are incorporated by reference in their entirety into this application.

BACKGROUND OF THE INVENTION

Field of the Invention

The present invention relates to a combustor, used in a gas turbine engine, which mixes and burns fuel gas such as hydrogen gas, water vapor, and air.

Description of Related Art

In recent years, as for gas turbine systems, a technique of injecting fuel and water or water vapor into a combustor in order to reduce generation of NOx in exhaust gas and enhance efficiency of the system, has been developed (for example, see Patent Documents 1 and 2).

RELATED DOCUMENT

Patent Document

[Patent Document 1] JP Laid-open Patent Publication No. H06-66156

[Patent Document 2] JP Laid-open Patent Publication No. 2015-75314

SUMMARY OF THE INVENTION

However, in the combustor disclosed in Patent Document 1, a water vapor nozzle and a gas fuel injection nozzle are disposed apart from each other, and water vapor and gas fuel are mixed in a combustion chamber only after having been injected into the combustor. Therefore, distribution in concentration of the fuel and the water vapor in the combustion chamber becomes non-uniform, and reduction of NOx contained in exhaust gas after combustion is insufficient. Meanwhile, in the combustor disclosed in Patent Document 2, since fuel gas and water vapor are premixed and then the mixture gas is injected into a combustion chamber, distribution in concentration of the fuel and the water vapor becomes uniform. However, since the water vapor and the fuel gas, between which the temperature difference is large, are brought into direct contact with each other in a fuel injection device, the water vapor condenses to be drain water.

An object of the present invention is to provide a gas turbine combustor capable of preventing water vapor from condensing to be drain water, and capable of achieving effective reduction in generation of NOx by uniformly mixing fuel and water vapor.

In order to attain the above object, a gas turbine combustor according to the present invention is a gas turbine combustor which is a combustor used in a gas turbine for mixing and burning a fuel gas, a water vapor, and an air.

The gas turbine combustor includes:

a fuel injection device including a fuel injection portion configured to directly inject the fuel gas into a combustion chamber, and a water vapor injection portion provided on at least one of a position radially outward of the fuel injection portion and a position radially inward of the fuel injection portion; and an air supply chamber provided on at least one of a position radially outward of the water vapor injection portion provided radially outward of the fuel injection portion, and a position radially inward of the water vapor injection portion provided radially inward of the fuel injection portion, the air supply chamber being configured to supply the air to be mixed with the water vapor injected from the water vapor injection portion.

According to this configuration, since the water vapor injection portion and the air supply chamber are adjacent to each other in the radial direction, the water vapor, which has been brought into contact with the high-temperature air and diluted by the air, can be brought into contact with the fuel gas, thereby preventing the water vapor from condensing to be drain water. Further, since the water vapor injection portion is interposed between the fuel injection portion and the air supply chamber, the vapor can be appropriately injected to a combustion reaction interface between the fuel gas and the air.

In one embodiment of the present invention, the gas turbine combustor may include: an outer-diameter-side water vapor injection portion provided radially outward of the fuel injection portion; an inner-diameter-side water vapor injection portion provided radially inward of the fuel injection portion; an outer air supply chamber provided radially outward of the outer-diameter-side water vapor injection portion; and an inner air supply chamber provided radially inward of the inner-diameter-side water vapor injection portion. According to this configuration, since the mixture of water vapor and air is injected from near the radially center portion to a primary combustion zone in the combustion chamber, the primary combustion zone is diluted, thereby enabling more uniform combustion.

In one embodiment of the present invention, the gas turbine combustor may further include an inner mixing promotion member configured to promote mixing of the water vapor supplied from the inner-diameter-side water vapor injection portion and the air supplied from the inner air supply chamber. According to this configuration, the water vapor, which has been mixed with the high-temperature air and diluted by the air, is brought into contact with the fuel gas, whereby the water vapor can be more reliably prevented from condensing to be drain water.

In one embodiment of the present invention, the fuel injection device may include an air introduction passage configured to introduce an air from the outer air supply chamber into the inner air supply chamber. According to this configuration, the air can be introduced into the inner-diameter-side air supply chamber, with a compact and simple structure.

In one embodiment of the present invention, the outer-diameter-side water vapor injection portion may be opened in the outer air supply chamber. The gas turbine combustor may further include an outer mixing promotion member configured to mix the water vapor supplied from the outer-diameter-side water vapor injection portion and the air supplied from the outer air supply chamber, and to inject the mixture into the combustion chamber. According to this configuration, also on the outer diameter side, the water vapor, which has been mixed with the high-temperature air and diluted by the air, is brought into contact with the fuel gas, whereby the water vapor can be more reliably prevented from condensing to be drain water.

In one embodiment of the present invention, the fuel injection portion may be formed with a fuel injection hole that is inclined in the circumferential direction. According to this configuration, the fuel gas to be injected into the combustion chamber can be swirled by the simple structure, without the necessity of additionally providing a member for swirling the fuel gas.

In the case where the fuel injection hole is inclined in the circumferential direction, a plurality of the fuel injection holes may be arranged in the radial direction. According to this configuration, the area near the opening of each fuel injection hole is reduced, thereby preventing the fuel gas injected in the inclined direction from being burnt on an end surface.

In one embodiment of the present invention, a combustion liner forming the combustion chamber may have air introduction holes in multiple stages in the axial direction, and the air introduction hole in an upstream-side stage may have a diameter greater than that of the air introduction hole in a downstream-side stage. According to this configuration, a larger amount of air is supplied to an upstream portion of the combustion chamber to dilute the primary combustion zone, thereby realizing uniform combustion.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
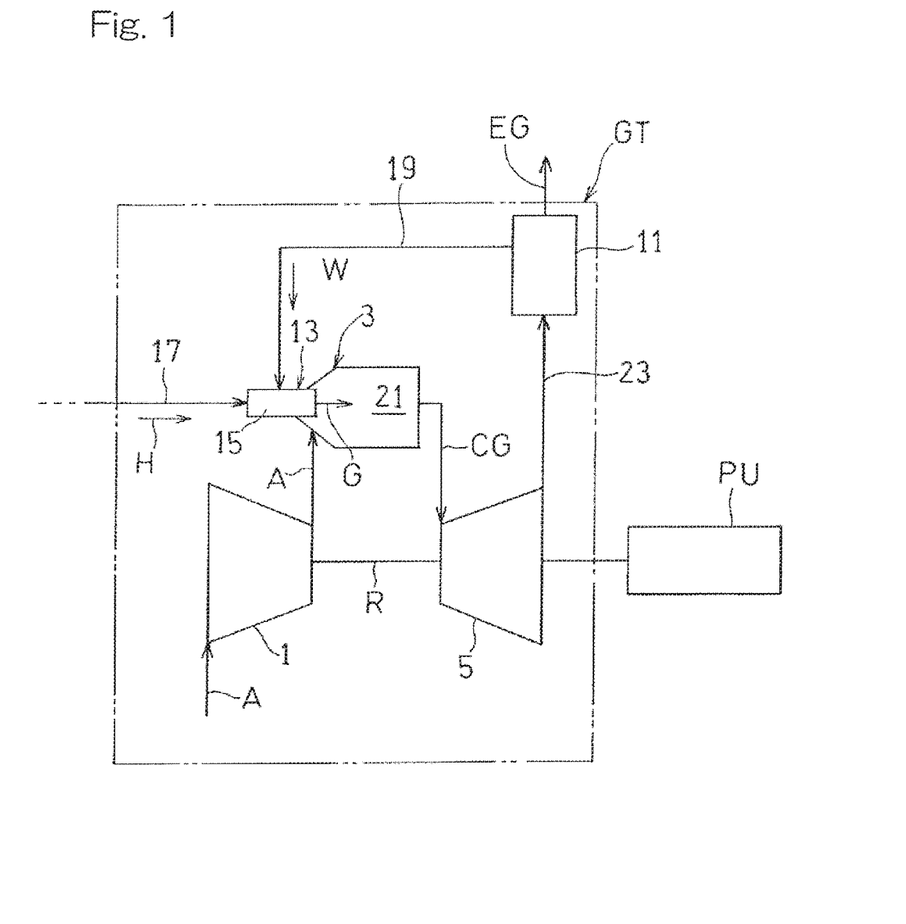
FIG. 1 is a schematic diagram showing a gas turbine system to which a combustor according to one embodiment of the present invention is applied.

Hereinafter, embodiments of the present invention will be described with reference to the drawings. FIG. 1 shows an example of a gas turbine system to which a combustor according to one embodiment of the present invention is applied. A gas turbine system GT shown in FIG. 1 includes: a compressor 1 configured to compress an air A; a combustor 3; a turbine 5; and a boiler 11. The boiler 11 generates water vapor W by using an exhaust gas EG from the turbine 5 as a heat source.

A fuel injection device 13 is provided at a top portion (most upstream portion) of the combustor 3. The fuel injection device 13 includes a fuel injection nozzle 15 connected with a first introduction passage 17 and a second introduction passage 19. The first introduction passage 17 introduces fuel gas H, such as hydrogen gas, from a fuel supply (not shown) into the fuel injection nozzle 15. The second introduction passage 19 introduces water vapor W, supplied from the boiler 11, into the fuel injection nozzle 15. The water vapor W is supplied in order to reduce a flame temperature in a combustion chamber 21 of the combustor 3, thereby suppressing generation of NOx. In the present embodiment, hydrogen gas is used as the fuel gas H. However, instead thereof, other fuel—such as natural gas—may be used as the fuel gas H.

Combustion of the compressed air A supplied from the compressor 1, the fuel gas H supplied from the fuel injection device 13, and the water vapor W is caused in the combustion chamber 21 to generate a high-temperature high-pressure combustion gas CG. The generated combustion gas CG is supplied to the turbine 5 to drive the turbine 5. The turbine 5 drives the compressor 1 through a rotation shaft R, and drives a load such as a generator PU.

The boiler 11 which generates the water vapor W is disposed on an exhaust passage 23 extending from the turbine 5. Waste heat recovered from the exhaust gas EG is utilized as a heat source for generating vapor in the boiler 11. The exhaust gas EG having passed through the boiler 11 passes through a silencer (not shown), and is then discharged to the outside. The boiler 11 is supplied with a water from an external water supply (not shown).

Figure 2:
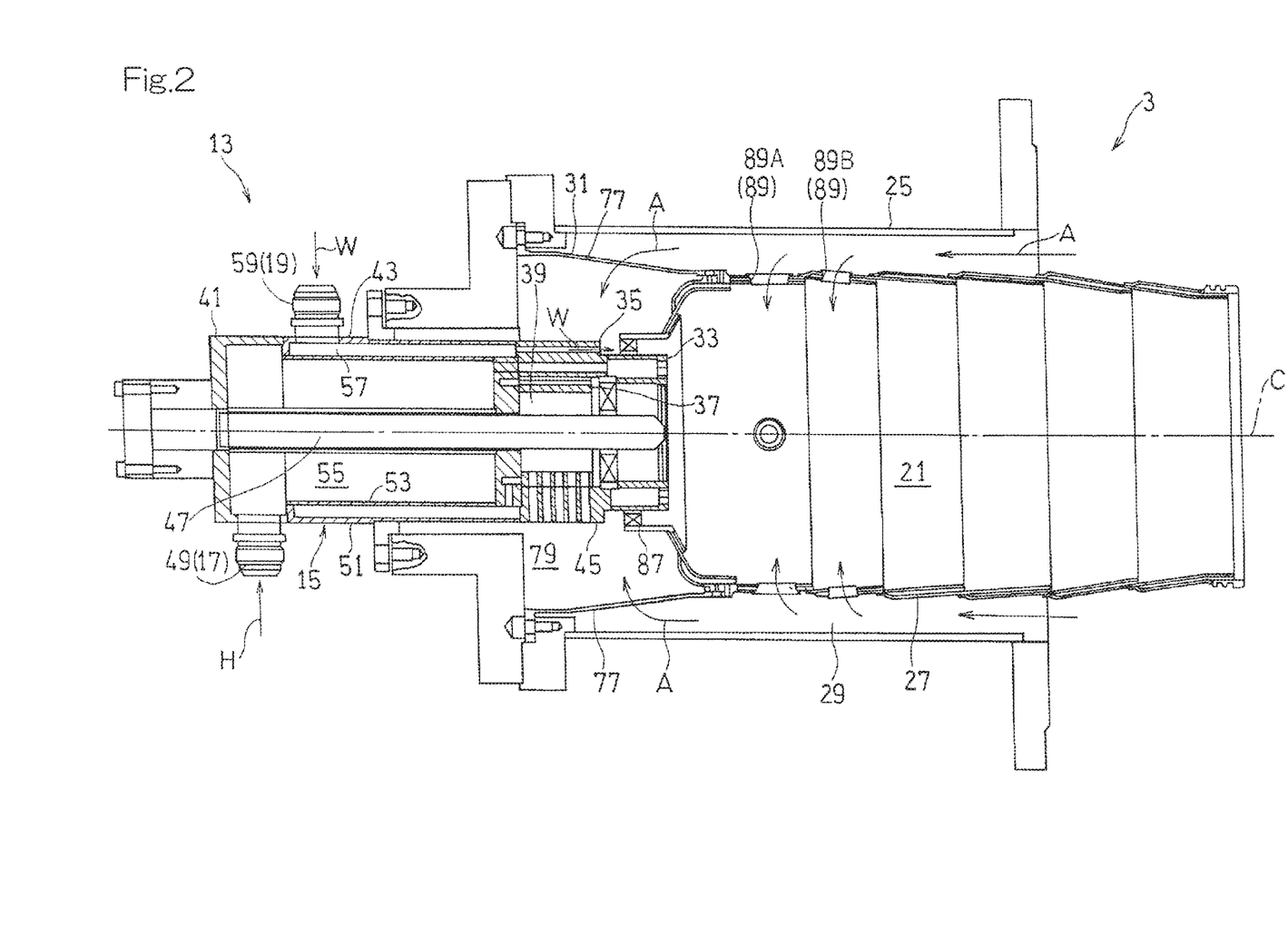
FIG. 2 is a longitudinal cross-sectional view of the combustor shown in FIG. 1.

FIG. 2 shows the combustor 3 according to the present embodiment. As shown in FIG. 2, the combustor 3 is of a single-can type, and is erected such that an axis C thereof is positioned within a vertical surface orthogonal to the rotation shaft R (FIG. 1). A combustion liner 27 forming the combustion chamber 21 is disposed inside a tubular housing 25. An air introduction passage 29, through which the air A compressed in the compressor 1 (FIG. 1) is introduced into the combustion chamber 21 of the combustor 3 and into the fuel injection device 13, is formed on the outer periphery of the combustion liner 27. Generally, a high-temperature air A, as high as 300° C. to 500° C. at an inlet of the combustor 3, is supplied from the compressor 1 to the combustor 3. A tubular wall 31, which is concentric with the combustion liner 27, is connected to the front side (fuel injection device 13 side) of the combustion liner 27. A space on the outer periphery side of the tubular wall 31 forms a downstream portion of the air introduction passage 29.

In the combustor 3, the fuel injection nozzle 15 of the fuel injection device 13 includes a fuel injection portion 33 configured to inject the fuel gas H supplied from the first introduction passage 17 directly into the combustion chamber 21. The fuel injection nozzle 15 further includes: an outer-diameter-side water vapor injection portion 35 which is provided radially outward of the fuel injection portion 33; and an inner-diameter-side water vapor injection portion 37 which is provided radially inward of the fuel injection portion 33. The outer-diameter-side water vapor injection portion 35 and the inner-diameter-side water vapor injection portion 37 respectively inject the water vapor W supplied from the second introduction passage 19 into the combustion chamber 21. In the fuel injection nozzle 15, an inner air supply chamber 39, which supplies the air A to be mixed with the water vapor W injected from the inner-diameter-side water vapor injection portion 37, is provided radially inward of the inner-diameter-side water vapor injection portion 37.

The fuel injection nozzle 15 is a member having a generally substantially cylindrical shape. The fuel injection nozzle 15 includes: a lid portion 41 located on the most upstream side; a body portion 43 of a double cylindrical structure connected to the downstream side of the lid portion 41; a header portion 45 which is located on the most downstream side and is connected to the downstream side of the body portion 43; and a pin member 47 of a round-bar shape which is disposed at the axial position and supports the lid portion 41, the body portion 43, and the header portion 45. A first introduction tube 49 forming the first introduction passage 17 is connected to the lid portion 41 (in the illustrated example, the peripheral wall of the lid portion 41).

A cylindrical partition wall 53 is disposed inward of an outer peripheral wall 51 of the body portion 43 so as to be concentric with the outer peripheral wall 51. The space inside the partition wall 53 communicates with the inner space of the lid portion 41, thereby forming a fuel supply passage 55. Meanwhile, an annular space, which is formed between the partition wall 53 and the outer peripheral wall 51 and is isolated from the fuel supply passage 55, forms a water vapor supply passage 57. A second introduction tube 59, which forms the second introduction passage 19 communicating with the water vapor supply passage 57, is connected to the outer peripheral wall 51 of the body portion 43.

Figure 3:
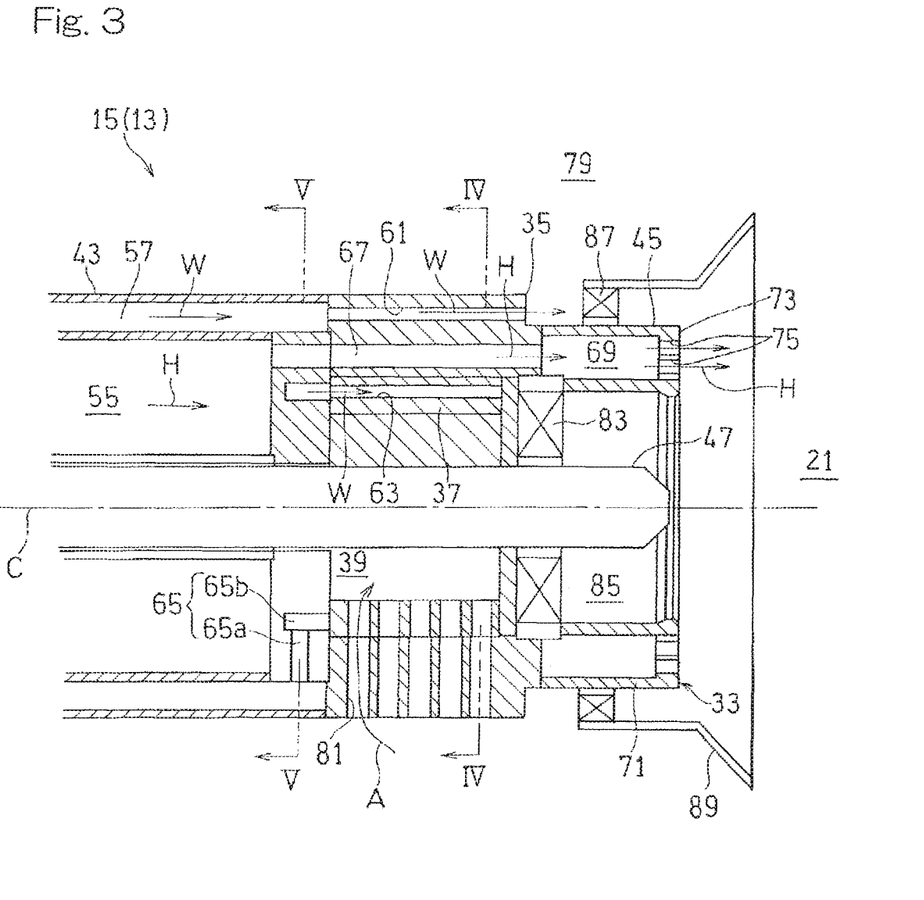
FIG. 3 is a longitudinal cross-sectional view showing a peripheral portion of a fuel injection portion of the combustor shown in FIG. 2 in an enlarged manner.

As shown in FIG. 3, the header portion 45 is provided with the fuel injection portion 33, the outer-diameter-side water vapor injection portion 35, and the inner-diameter-side water vapor injection portion 37. The outer-diameter-side water vapor injection portion 35 has an outer-diameter-side water vapor injection hole 61 formed as a through-hole extending in the axial direction, at an outer-diameter-side portion of the header portion 45. The outer-diameter-side water vapor injection hole 61 directly communicates with the water vapor supply passage 57. The inner-diameter-side water vapor injection portion 37 has an inner-diameter-side water vapor injection hole 63 extending in the axial direction, at an inner-diameter-side portion of the header portion 45. The inner-diameter-side water vapor injection hole 63 communicates with a water vapor communication passage 65 formed upstream thereof. The water vapor communication passage 65 includes: a first water vapor communication passage portion 65a which is a hole extending radially inward of the header portion 45 from a downstream portion of the water vapor supply passage 57; and a second water vapor communication passage portion 65b which allows therethrough a downstream end of the first water vapor communication passage portion 65a to communicate with an upstream end of the inner-diameter-side water vapor injection hole 63.

Figure 4:
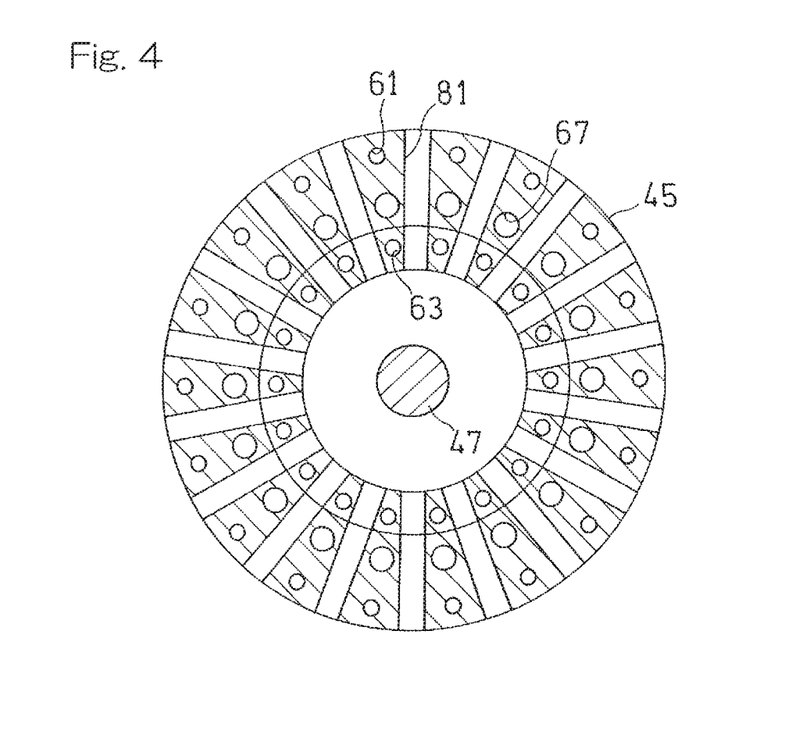
FIG. 4 is a cross-sectional view taken along a IV-IV line in FIG. 3.
Figure 5:
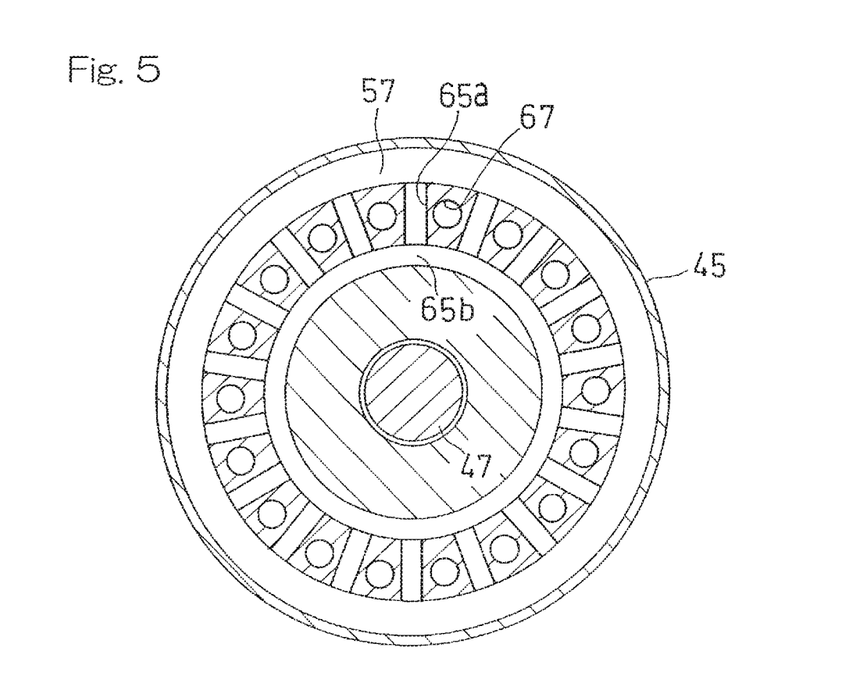
FIG. 5 is a cross-sectional view taken along a V-V line in FIG. 3.

As shown in FIG. 4, a plurality of (in the illustrated example, eighteen) outer-diameter-side water vapor injection holes 61 are provided at equal intervals in the circumferential direction of the header portion 45. A plurality of (in the illustrated example, eighteen) inner-diameter-side water vapor injection holes 63 are provided at equal intervals in the circumferential direction of the header portion 45. Further, as shown in FIG. 5, a plurality of (in the illustrated example, eighteen) first water vapor communication passage portions 65a are provided at equal intervals in the circumferential direction of the header portion 45. The second water vapor communication passage portion 65b is formed as an annular space.

As shown in FIG. 3, in the header portion 45, a fuel communication passage 67 communicating with the fuel supply passage 55 is formed at a radial position between an outer-diameter-side water vapor injection hole 61 and an inner-diameter-side water vapor injection hole 63. The fuel communication passage 67 is formed as a hole extending in the axial direction. A fuel header chamber 69 formed as an annular space communicates with a downstream end of the fuel communication passage 67. The fuel header chamber 69 is formed inside a hollow peripheral wall 71. The peripheral wall 71 has an end wall 73 that faces the combustion chamber 21 and is formed with a fuel injection hole 75 of the fuel injection portion 33. As shown in FIG. 4, a plurality of (in the illustrated example, eighteen) fuel communication passages 67 are provided at equal intervals in the circumferential direction of the header portion 45.

Figure 6:
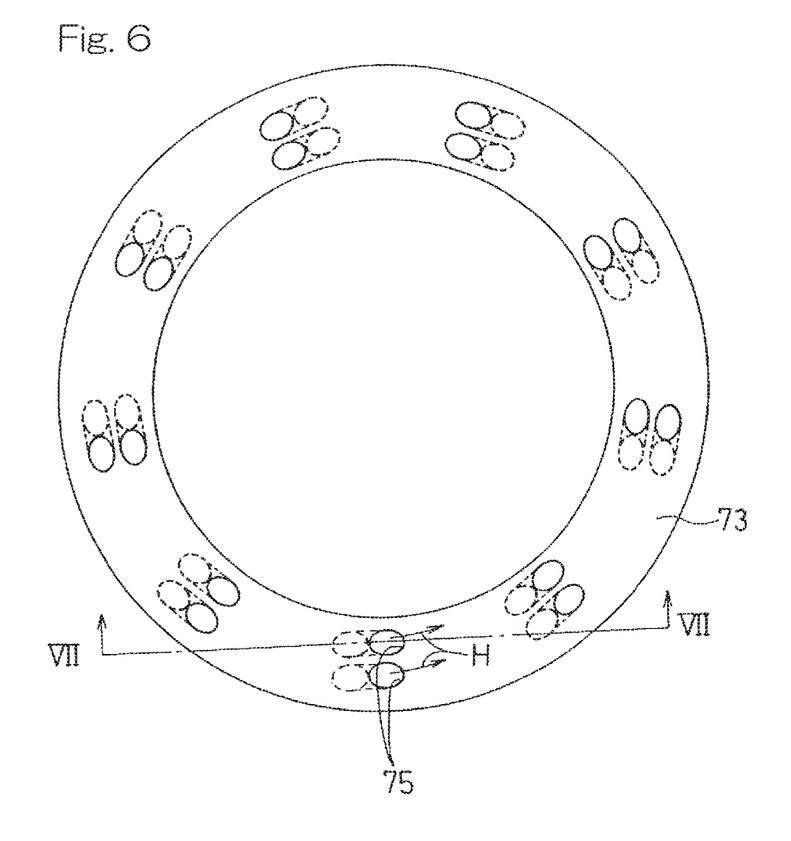
FIG. 6 is a front view of the fuel injection portion of the combustor shown in FIG. 2.
Figure 7:
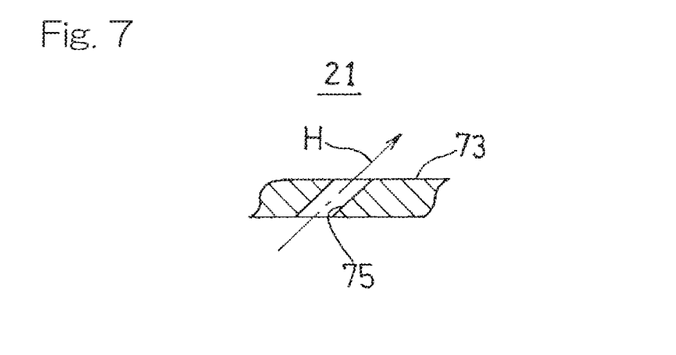
FIG. 7 is a cross-sectional view taken along a VII-VII line in FIG. 6.

In the present embodiment, as shown in FIG. 6, a plurality of (in the illustrated example, nine) fuel injection holes 75 are provided at equal intervals in the circumferential direction while a plurality of (in the illustrated example, two) fuel injection holes 75 are provided in the radial direction. As shown in FIG. 7, each fuel injection hole 75 is formed so as to be inclined in the circumferential direction, in the end wall 73 of the fuel injection nozzle 15. The terms "inclined in the circumferential direction" means "inclined in the circumferential direction with respect to the axial direction, within a plane orthogonal to the radial direction of the fuel injection nozzle 15".

The fuel injection holes 75 may be formed parallel with the axial direction. However, by inclining the fuel injection holes 75 in the circumferential direction, the fuel gas H to be injected into the combustion chamber 21 can be swirled by the simple structure, without the necessity of additionally providing a member for swirling the fuel gas H. The angle of inclination of the fuel injection holes 75 may be set as appropriate. However, the range of the angle of inclination with respect to the axial direction is preferably 20° to 70°, more preferably, 30° to 60°. In the case where the fuel injection holes 75 are inclined in the circumferential direction as described above, arranging a plurality of fuel injection holes 75 in the radial direction causes the area around the openings of the fuel injection holes 75 to be reduced, thereby preventing the fuel gas H injected in the inclined direction from being burnt on the end wall 73.

As shown in FIG. 2, the tubular wall 31 has a plurality of air introduction openings 77 arranged at equal intervals in the circumferential direction. The air A flowing through the air introduction passage 29 flows into the inner space of the tubular wall 31 through the air introduction openings 77. In the inner space of the tubular wall 31, a downstream portion of the fuel injection nozzle 15, including the header portion 45, is disposed. With such an arrangement, the inner space of the tubular wall 31, i.e., the space radially outward of the outer-diameter-side water vapor injection portion 35, forms an outer air supply chamber 79 which supplies the air A to be mixed with the water vapor W injected from the outer-diameter-side water vapor injection portion 35.

As shown in FIG. 3, the fuel injection nozzle 15 of the fuel injection device 13 includes an air supply passage 81 which supplies the air A from the outer air supply chamber 79 to the inner air supply chamber 39. Specifically, the air supply passage 81 is provided as a through-hole extending in the radial direction of the header portion 45 of the fuel injection nozzle 15. A plurality of air introduction passages 81 are provided side by side in the axial direction, and a plurality of (in the illustrated example, eighteen) air introduction passages 81 are provided at equal intervals in the circumferential direction as shown in FIG. 4.

In this example, the outer-diameter-side water vapor injection holes 61, the fuel communication passages 67, and the inner-diameter-side water vapor injection holes 63, which are equal in number, are disposed at the same circumferential positions in the header portion 45, and the air supply passages 81, which number the same as the fuel communication passages 67, are disposed at circumferential positions between the respective fuel communication passages 67. However, the numbers and arrangement of these are not limited to those in the illustrated example, and may be set as appropriate as long as the air supply passages 81 do not interfere with the outer-diameter-side water vapor injection holes 61, the fuel communication passages 67, and the inner-diameter-side water vapor injection holes 63.

On the downstream side of the inner air supply chamber 39 in the header portion 45 shown in FIG. 3, an inner mixing promotion member 83 is provided for promoting mixing of the water vapor W supplied from the inner-diameter-side water vapor injection portion 37 with the air A supplied from the inner air supply chamber 39. In the illustrated example, a swirler (fixed swirl vane) is used as the inner mixing promotion member 83. However, as for the inner mixing promotion member 83, any other member such as a porous plate having many through-holes formed therein may be used.

The inner-diameter-side water vapor injection portion 37 is formed so as to inject the water vapor W directly to the inner mixing promotion member 83 which is a swirler. In addition, the inner mixing promotion member 83 is disposed at an axial position upstream of the end wall 73 of the header portion 45 where the fuel injection holes 75 are formed (in the illustrated example, a position corresponding to a contact portion of the fuel communication passage 67 and the fuel header chamber 69). Therefore, a space radially inward of the peripheral wall 71, which forms the fuel header chamber 69, forms a premixing passage 85 in which the air A and the water vapor W, both having passed through the inner mixing promotion member 83, are premixed with each other.

As described above, since the inner-diameter-side water vapor injection portion 37 and the inner air supply chamber 39 are provided in the radially inward portion of the fuel injection device 13, the mixture of the water vapor W and the air A is injected from near the radially center portion into the combustion chamber 21, whereby a primary combustion zone is diluted, and uniform combustion can be achieved. In addition, since the air supply passages 81 as through-holes extending in the radial direction are provided to supply the air A from the outer air supply chamber 79 to the inner-diameter-side water vapor injection portion 37, the air A can be introduced into the inner air supply chamber 39 by a compact and simple structure.

Furthermore, in the present embodiment, the inner-diameter-side water vapor injection portion 37 and the inner air supply chamber 39 are disposed adjacent to each other in the radial direction, and the water vapor W, which has been diluted by the air A, comes into contact with the fuel gas H. Therefore, the water vapor W can be prevented from condensing to be drain water even if the inner mixing promotion member 83 is omitted. However, when mixing of the water vapor W supplied from the inner-diameter-side water vapor injection portion 37 with the high-temperature air A supplied from the inner air supply chamber 39 is promoted by the inner mixing promotion member 83, the water vapor W can be more assuredly prevented from condensing to be drain water.

In the illustrated example, the inner mixing promotion member 83 as a swirler is provided around the bar-shaped pin member 47 provided at the axial position, whereby a swirl flow of the water vapor W and the air A can be efficiently generated around the pin member 47.

The outer-diameter-side water vapor injection hole 61 is opened in the outer air supply chamber 79. In other words, the outer-diameter-side water vapor injection hole 61 is opened at an axial position that is upstream of the end wall 73 of the header portion 45 where the fuel injection holes 75 are formed. An outer swirler as an outer mixing promotion member 87 is provided at a position apart in the axial direction from the outer-diameter-side water vapor injection hole 61. The water vapor W supplied from the outer-diameter-side water vapor injection portion 35 and the high-temperature air A supplied from the outer air supply chamber 79 are mixed through the outer mixing promotion member 87, and the mixture is injected as a swirl flow into the combustion chamber 21. The outer swirler as the outer mixing promotion member 87 is provided on an annular nozzle member 89 which fits to an outer peripheral surface of the peripheral wall 71 of the header portion 45.

In the present embodiment, the outer-diameter-side water vapor injection portion 61 and the outer air supply chamber 79 are adjacent to each other in the radial direction, and the water vapor W, which has been diluted by the air A, comes into contact with the fuel gas H. Therefore, even when the outer-diameter-side water vapor injection hole 61 is opened in the combustion chamber 21 and the water vapor W is injected directly into the combustion chamber 21, the water vapor W can be prevented from condensing to be drain water. However, as in the illustrated example, the outer-diameter-side water vapor injection hole 61 is opened in the outer air supply chamber 79, and the water vapor W supplied from the outer-diameter-side water vapor injection portion 35 and the high-temperature air A in the outer air supply chamber 79, which have been mixed by the outer mixing promotion member 87, are injected as a swirl flow into the combustion chamber 21, whereby the water vapor W can be more reliably prevented from condensing to be drain water.

An air introduction hole 89 is formed penetrating the combustion liner 27 shown in FIG. 2. The air A flowing through the air introduction passage 29 is introduced into the combustion chamber 21 through the air introduction hole 89. A plurality of air introduction holes 89 are formed at equal intervals in the circumferential direction, at the same axial position in the combustion liner 27. The plurality of air introduction holes 89 at the same axial position are formed in multiple stages (two stages in this example) in the axial direction. Both the two stages of air introduction holes 89 are provided at axial positions corresponding to the primary combustion zone in an upstream portion of the combustion chamber 21. In the present embodiment, the diameter of each of air introduction holes 89A in the upstream-side stage is formed to be larger than the diameter of each of air introduction holes 89B in the downstream-side stage. The larger diameter of each air introduction hole 89A in the upstream-side stage allows a large amount of air to be supplied to the upstream portion of the combustion chamber 21, and the primary combustion zone is diluted by the air. As a result, uniform combustion is realized.

In the present embodiment, the outer-diameter-side water vapor injection portion 35 and the inner-diameter-side water vapor injection portion 37 are provided as water vapor injection portions for projecting the water vapor, and the outer air supply chamber 79 and the inner air supply chamber 39 are provided as air supply chambers corresponding to the respective water vapor injection portions 35 and 37. However, as for the water vapor injection portion, at least one of the outer-diameter-side water vapor injection portion 35 and the inner-diameter-side water vapor injection portion 37 may be provided, and the air supply chamber corresponding to the water vapor injection portion may be provided at a radial position on the opposite side to the fuel injection portion 33 with respect to the water vapor injection portion. For example, in a combustor 3 according to another embodiment of the present invention shown in FIG. 8, only the outer-diameter-side water vapor injection portion 35 is provided as the water vapor injection portion, and only the outer air supply chamber 79 is provided as the air supply chamber, which is located radially outward of the outer-diameter-side water vapor injection portion 35.

Figure 8:
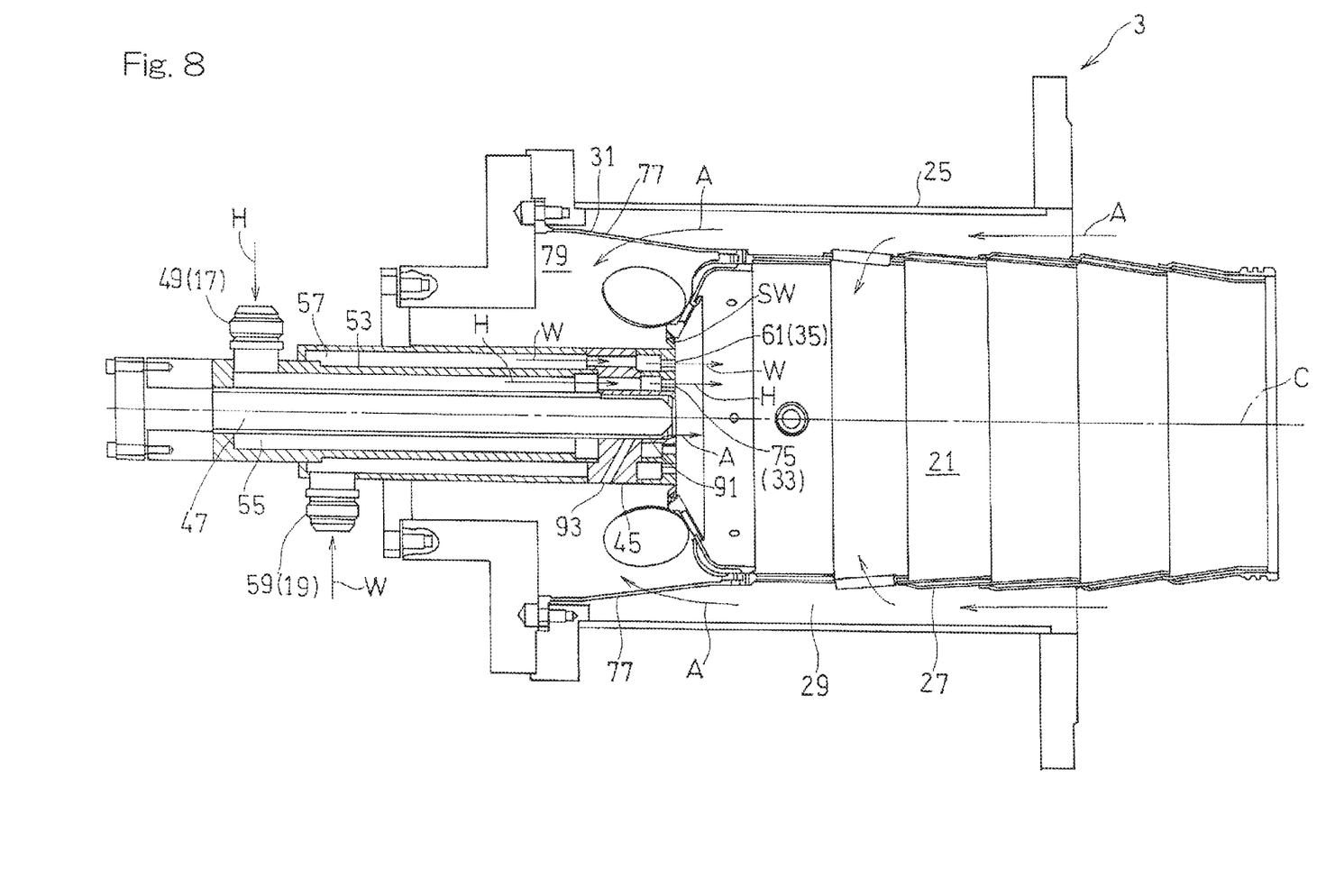
FIG. 8 is a longitudinal cross-sectional view of a combustor according to another embodiment of the present invention.

In the embodiment shown in FIG. 8, the opening position, in the axial direction, of the outer-diameter-side water vapor injection hole 61 of the outer-diameter-side water vapor injection portion 35, is the same as the opening position, in the axial direction, of the fuel injection hole 75 of the fuel injection portion 33, so that the water vapor W is directly injected from the outer-diameter-side water vapor injection hole 61 into the combustion chamber 21. A swirler SW, which causes the air A from the outer air supply chamber 79 to be mixed with the water vapor W in the combustion chamber 21, is provided at the outer diameter side of the outer-diameter-side water vapor injection hole 61.

Further, in the present embodiment, an annular cooling passage 91 is formed between the header portion 45 and the pin member 47 of the fuel injection nozzle 15. A coolant supply passage 93, which supplies cooling air from the outer air supply chamber 79 to the cooling passage 91, is formed penetrating the header portion 45. Part of the compressed air A taken from the outer air supply chamber 79 into the cooling passage 91 through the coolant supply passage 93 cools the surface of the pin member 47. The air A after having cooled the pin member 47 is discharged from an air injection hole 95 to the combustion chamber 21.

In the combustor 3 according to each of the aforementioned embodiments, since the water vapor injection portion 35, 37 and the air supply chamber 79, 39 are adjacent to each other in the radial direction, the water vapor W, which has been brought into contact with the high-temperature air A and diluted by the air A, can be brought into contact with the fuel gas H, thereby preventing the water vapor W from condensing to be drain water. Further, since the water vapor injection portion 35, 37 and the fuel injection portion 33 are adjacent to each other in the radial direction, the vapor W can be appropriately injected to a combustion reaction interface between the fuel gas H and the air A in the primary combustion zone in the combustion chamber 21.

Although the present invention has been described above in connection with the preferred embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

3 . . . Combustor
13 . . . Fuel injection device
33 . . . Fuel injection portion
35 . . . Outer-diameter-side water vapor injection portion (water vapor injection portion)
37 . . . Inner-diameter-side water vapor injection portion (water vapor injection portion)
39 . . . Inner air supply chamber (air supply chamber)
79 . . . Outer air supply chamber (air supply chamber)
A . . . Air
GT . . . Gas turbine system
H . . . Fuel gas
W . . . Water vapor

What is claimed is:

1. A gas turbine combustor which is a combustor used in a gas turbine for mixing and burning a fuel gas, a water vapor, and an air, the gas turbine combustor comprising:
   a fuel injection device including a fuel injection portion configured to directly inject the fuel gas into a combustion chamber;
   an outer-diameter-side water vapor injection portion provided radially outward of the fuel injection portion;
   an inner-diameter-side water vapor injection portion provided radially inward of the fuel injection portion;
   an outer air supply chamber provided radially outward of the outer-diameter-side water vapor injection portion;
   an inner air supply chamber provided radially inward of the inner-diameter-side water vapor injection portion; and
   an outer mixing promotion member configured to mix the water vapor supplied from the outer-diameter-side water vapor injection portion and the air supplied from the outer air supply chamber, and to inject the mixture into the combustion chamber,
   wherein a cross-section comprises a plane perpendicular to a direction in which the fuel injection portion is opened directly into the combustion chamber,
   wherein the direction is parallel to a longitudinally central axis of the combustion chamber, and
   wherein the outer-diameter-side water vapor injection portion is opened to the outer air supply chamber.

2. The gas turbine combustor as claimed in claim 1, further comprising an inner mixing promotion member configured to promote mixing of the water vapor supplied from the inner-diameter-side water vapor injection portion and air supplied from the inner air supply chamber.

3. The gas turbine combustor as claimed in claim 1, wherein the fuel injection device includes an air introduction passage configured to introduce an air from the outer air supply chamber into the inner air supply chamber.

4. The gas turbine combustor as claimed in claim 1, wherein the fuel injection portion is formed with a fuel injection hole that is inclined in a circumferential direction.

5. The gas turbine combustor as claimed in claim 4, wherein a plurality of the fuel injection holes are arranged in a radial direction.

6. The gas turbine combustor as claimed in claim 1, wherein
   a combustion liner forming the combustion chamber has air introduction holes in multiple stages in an axial direction, and
   the air introduction hole in an upstream-side stage has a diameter greater than that of the air introduction hole in a downstream-side stage.

7. A gas turbine combustor which is a combustor used in a gas turbine for mixing and burning a fuel gas, a water vapor, and an air, the gas turbine combustor, comprising:
   a fuel injection device including a fuel injection portion configured to directly inject the fuel gas into a combustion chamber, an outer-diameter-side water vapor injection portion provided radially outward of the fuel injection portion, and an inner-diameter-side water vapor injection portion provided radially inward of the fuel injection portion; and an outer air supply chamber provided radially outward of the outer-diameter-side water vapor injection portion, the outer air supply chamber being configured to supply the air to be mixed with the water vapor injected from the outer-diameter-side water vapor injection portion, and inject a mixture of the water vapor and the air into the combustion chamber, an inner air supply chamber provided radially inward of the inner-diameter-side water vapor injection portion and configured to supply the air to be mixed with the water vapor injected from the inner-diameter-side water vapor injection portion, and inject a mixture of the water vapor and the air into the combustion chamber, wherein the outer-diameter-side water vapor injection portion is opened to the outer air supply chamber, and the gas turbine combustor further comprises an outer mixing promotion member provided on a downstream side of the outer-diameter-side water vapor injection portion configured to mix the water vapor supplied from the outer-diameter-side water vapor injection portion and the air supplied from the outer air supply chamber, and to inject the mixture into the combustion chamber.

8. The gas turbine combustor as claimed in claim 7, further comprising an inner mixing promotion member configured to promote mixing of the water vapor supplied from the inner-diameter-side water vapor injection portion and air supplied from the inner air supply chamber.

9. The gas turbine combustor as claimed in claim 7, wherein the fuel injection device includes an air introduction passage configured to introduce an air from the outer air supply chamber into the inner air supply chamber.

10. The gas turbine combustor as claimed in claim 7, wherein the fuel injection portion is formed with a fuel injection hole that is inclined in a circumferential direction.

11. The gas turbine combustor as claimed in claim 10, wherein a plurality of the fuel injection holes are arranged in a radial direction.

12. The gas turbine combustor as claimed in claim 7, wherein a combustion liner forming the combustion chamber has air introduction holes in multiple stages in an axial direction, and the air introduction hole in an upstream-side stage has a diameter greater than that of the air introduction hole in a downstream-side stage.

* * * * *